(12) United States Patent
Liao (10) Patent No.: US 7,959,120 B2
(45) Date of Patent: Jun. 14, 2011

(54) UNIVERSAL SUPPORT FOR CONNECTING TO A BASE OF A VEHICLE SEAT

(76) Inventor: Chin-Hui Liao, Dali (TW)

( * ) Notice: Subject to any disclaimer, the term of this patent is extended or adjusted under 35 U.S.C. 154(b) by 319 days.

(21) Appl. No.: 12/340,535

(22) Filed: Dec. 19, 2008

(65) Prior Publication Data

US 2009/0224122 A1 Sep. 10, 2009

(30) Foreign Application Priority Data

Mar. 10, 2008 (TW) ................ 97204037 U
Mar. 10, 2008 (TW) ................ 97204039 U (51) Int. Cl.
*E04G 3/00* (2006.01)
*A47F 5/00* (2006.01)
*F16M 11/04* (2006.01)

(52) U.S. Cl. .............. 248/278.1; 248/176.3; 248/178.1; 248/288.51; 248/122.1; 248/292.12

(58) Field of Classification Search .............. 248/176.3, 248/278.1, 279.1, 276.1, 288.51, 292.12, 248/178.1, 122.1, 179.1, 181.1, 288.31
See application file for complete search history.

(56) References Cited

U.S. PATENT DOCUMENTS

| | | | | | |
|---|---|---|---|---|---|
| 1,275,311 | A | * | 8/1918 | Schumacher et al. | 248/279.1 |
| 4,458,870 | A | * | 7/1984 | Duncan et al. | 248/279.1 |
| 6,138,970 | A | * | 10/2000 | Sohrt et al. | 248/278.1 |
| 6,209,835 | B1 | * | 4/2001 | Walrath et al. | 248/276.1 |
| 6,220,556 | B1 | * | 4/2001 | Sohrt et al. | 248/279.1 |
| 2007/0164176 | A1 | * | 7/2007 | Liao | 248/176.3 |

* cited by examiner

*Primary Examiner* — Tan Le (57) ABSTRACT

A universal support is provided in the present invention. The universal support includes a brace unit, a mounting unit and a connecting unit, in which the brace unit has several joint assemblies with stronger mechanical strength and several quick-release clamp unit to carry heavier load, while the connecting unit can be securely fastened to a stationary object and the mounting unit can perform universally rotation so as to perfectly satisfy every need of the users.

10 Claims, 6 Drawing Sheets

UNIVERSAL SUPPORT FOR CONNECTING TO A BASE OF A VEHICLE SEAT

BACKGROUND OF THE INVENTION

1. Field of the Invention

The present invention relates to a universal support, and more particularly to an onboard universal support to firmly support a laptop computer.

2. Description of the Prior Art

A conventional support for installing camera, video camera, laptop computer and the like is provided, so as to allow the user to employ the above-mentioned equipment steadily.

However, there are still some disadvantages remaining in the conventional support listed as follow:

1. Conventional support cannot be firmly secured onboard. For example, the conventional support cannot be installed onto an uneven ground surface of a vehicle due to the unadjustable angle of the leg thereof.

2. Conventional support has multiple-tubed assemblies to adjust its length with quick-release clamps fastening the adjacent tubes with each other, yet the quick-release clamps fail to provide sufficient clamping strength so that the conventional support cannot carry heavy-loaded equipment, i.e. a laptop computer.

SUMMARY OF THE INVENTION

The main object of the present invention is to provide a universal support which can be firmly secured onboard.

Another object of the present invention is to provide a universal support with multiple-tubed assembly, on which a quick-release clamp providing sufficient clamping strength is installed to carry heavy-loaded equipment.

To achieve the above object, a universal support is provided. The universal support includes a brace unit, a mounting unit and a connecting unit. The brace unit includes first and second tube assemblies which are multiple-tubed. On the first and second tube assemblies disposed first and second quick-release clamp units. The quick-release clamp unit includes a clamping tube, on which a horizontal slot and a vertical slot is disposed. The horizontal slot and the vertical slot communicate with each other, and the horizontal slot has an extending angle of 180 iã iÀ, such that the quick-release clamp unit provides the tube assemblies with stronger clamping strength.

In the present universal support, the connecting unit includes a fastening base, a connecting plate, a supporting plate, a bolt and a supporting member. The supporting member includes a first screw and a socket head. The first screw is elevatably fastened to a third through hole of the supporting plate. On a bottom end of the first screw disposed a ball head covered by the socket head, and the socket head is universally rotatable with respect to the ball head. Thereby, the universal support can be fixed onboard firmly.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figures 1, 1A:
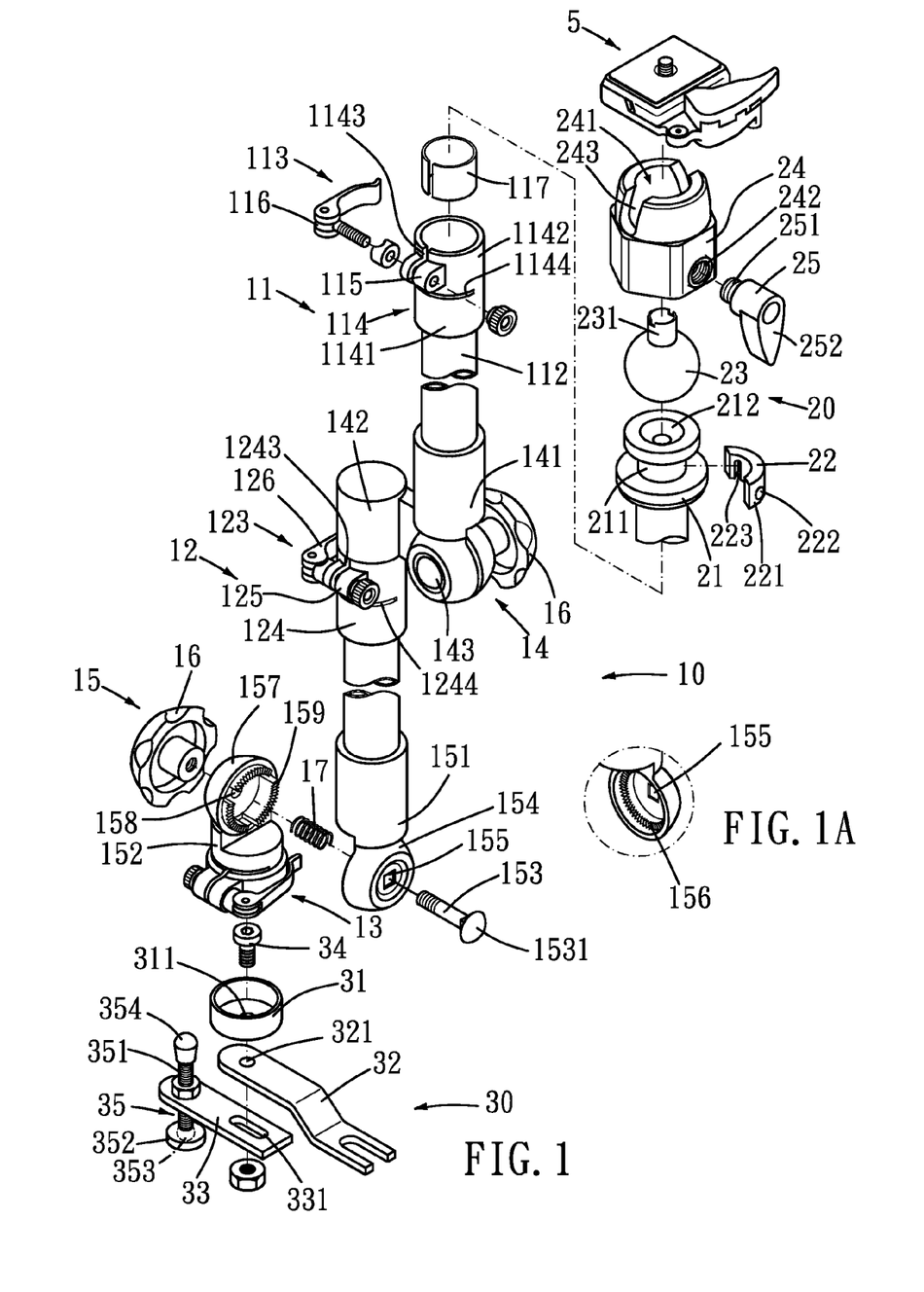
FIG. 1 is an explosive drawing in accordance with a preferred embodiment of the present invention.
FIG. 1A is a drawing showing an adjusting part of the present invention.
Figure 2:
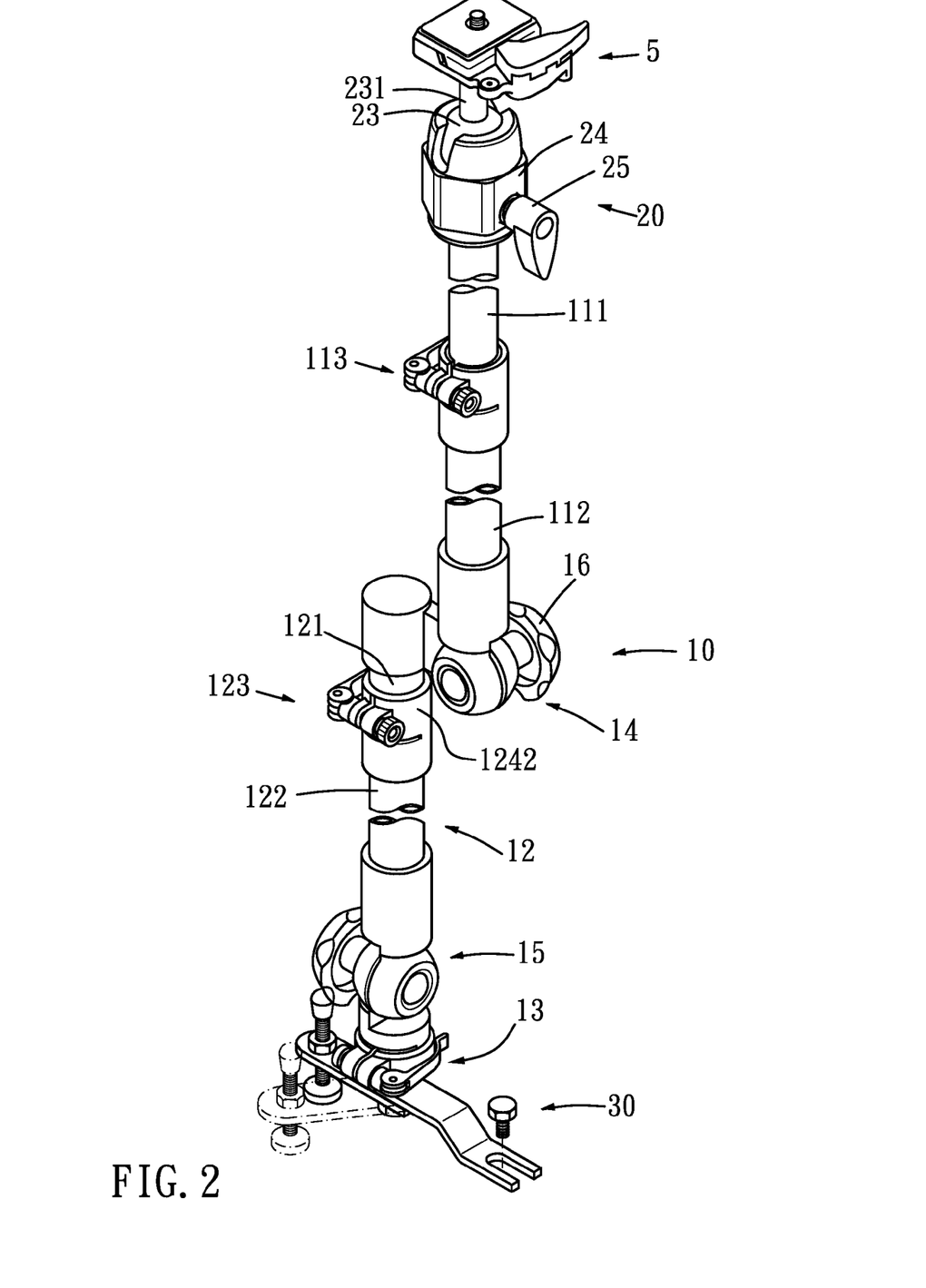
FIG. 2 is a schematic drawing in accordance with a preferred embodiment of the present invention.
Figures 3, 3A, 3B:
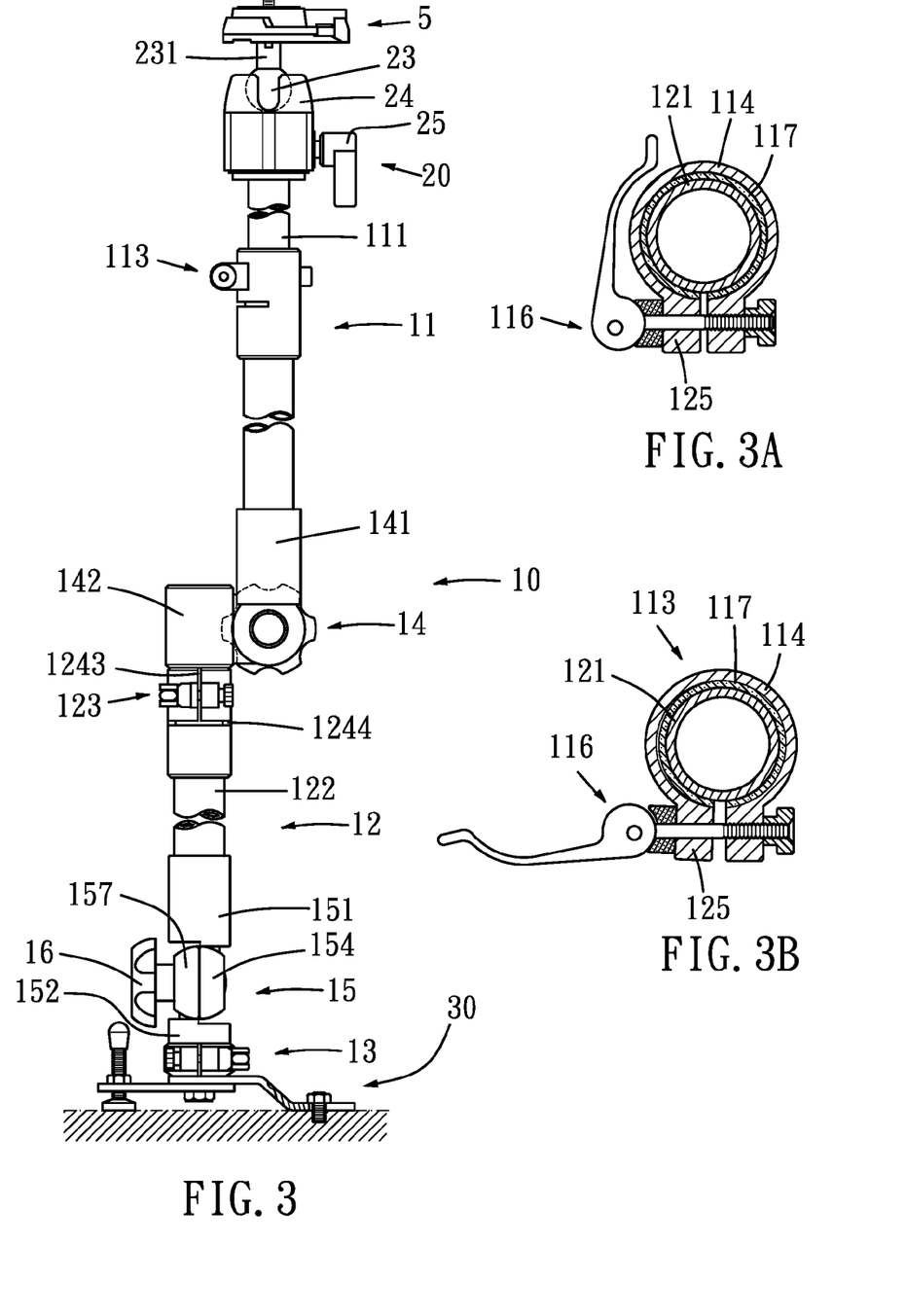
FIG. 3 is a side view in accordance with a preferred embodiment of the present invention.
FIG. 3A is a profile (I) of a quick-release clamp unit of the present invention.
FIG. 3B is a profile (II) of a quick-release clamp unit of the present invention.

Please refer to FIG. 1 to FIG. 3 for an explosive drawing, a schematic drawing and a side view of a preferred embodiment of the present invention. A universal support of the present invention includes a brace unit 10, a mounting unit 20 and a connecting unit 30. The mounting unit 20 is disposed on a top end of the brace unit 10, and the connecting unit 30 is disposed on a bottom end of the brace unit 10.

In which, the brace unit 10 includes a first tube assembly 11, a second tube assembly 12, a third tube assembly 13, a first joint assembly 14 and a second joint assembly 15. The first and second tube assemblies 11, 12 include first and second inner tubes 111, 112 and first and second outer tubes 112, 122 respectively. The inner tubes 111, 121 are telescopically received in the outer tubes 112, 122. Around outer surfaces of the outer tubes 112, 122 are disposed first and second quick-release clamp units 113, 123 respectively. The first inner tube 111 connects to the mounting unit 20, while the third tube assembly 13 connects to the connecting unit 30. The first joint assembly 14 is pivoted between the first and second tube assemblies 11, 12, and the second joint assembly 15 is pivoted between the second and third tube assemblies 12, 13.

The first quick-release clamp unit 113 includes a first clamping tube 113, a pair of first ears 115 and a first quick-release clamp assembly 116. In which the first clamping tube 113 includes a first end 1141 and a second end 1142. The first end 1141 is fastened to the first outer tube 112, and the second end 1142 receives the first inner tube 111. On the second end 1142 is axially disposed a vertical slot 1143, and on the first clamping tube 114 is radially disposed a horizontal slot 1144 communicating with the vertical slot 1143. In addition, the pair of first ears 115 protrudes on both sides of the vertical slot 1143, while the first quick-release clamp assembly 116 pierces through the first ears 115.

Same as first quick-release clamp unit 113, the second quick-release clamp unit 123 also includes a second clamping tube 123, a pair of second ears 125 and a second quick-release clamp assembly 126. Moreover, the second clamping tube 124 also has a vertical slot 1243 and a horizontal slot 1244 similar to those of the first clamping tube 113. In which, the horizontal slots 1144, 1244 are disposed at an extending angle of 180 iã iÀ. Therefore, as show in FIG. 3A and 3B, the second end 1142 of the first quick-release clamp unit 113 and the second end 1242 of the second quick-release clamp unit 123 can function as a pair of clamping jaws, with larger deformation space, respectively. Thereby, the first and second quick-release clamp units 113, 123 perform better clamping result, allowing the universal support to carry heavier load.

Furthermore, the first and second quick-release clamp units 113, 123 further include a first C-shaped tube 117 and a second C-shaped tube (unnumbered) respectively. The first C-shaped tube 117 is sandwiched between the second end 1142 of the first clamping tube 114 and the first inner tube 111, while the second C-shaped tube is sandwiched between the second end 1242 of the clamping tube 124 and the second inner tube 121. The C-shaped tubes are made of, for example, plastic material so as to securely fasten with the inner tubes.

The connecting unit 30 includes a fastening base 31, a connecting plate 32, a supporting plate 33, a bolt 34 and a supporting member 35. The fastening base 31 fastens to a bottom end of the third tube assembly 13, and a bottom of the fastening base 31 has a first through hole 311. One end of the connecting plate 32 is disposed a fork functioning as a connecting member to connect to a stationary object, such as a base of a vehicle seat. Another end of the connecting plate 32 is formed with a second through hole 321. Moreover, on both ends of the supporting plate 33 are disposed a pivoting hole 331 and a third through hole (unnumbered) respectively, while the bolt 34 pierces through the first through hole 311, the second through hole 321 and the pivoting hole 331, and a bottom end of the bolt 34 proximate to the pivoting hole 331 mounts a nut, thereby fixing the connecting plate 32, the supporting plate 33 to the bottom end of the third tube assembly 13. In which, the pivoting hole 331 can be a elongated hole so that the supporting plate 33 is horizontally movable as well as rotatable with respect to the fastening base 31. In addition, the supporting member 35 includes a first screw 351 and a socket head 352. The first screw 351 is elevatably fastened to the third through hole, and a top thereof is formed with a plastic cap 354 to prevent the screw 351 from escaping out of the third through hole and to facilitate users to tune the screw 351 thereby. On a bottom end of the first screw 351 is disposed a ball head 353 covered by the socket head 352, so that the socket head 352 is universally rotatable with respect to the ball head 353. By the structure design disclosed hereinabove, the angle between the supporting plate 33 and the connecting plate 32 can be adjusted as desire, and the supporting member 35 is elevatably while the socket head 352 thereof is universally rotatable so as to perfectly fit for a ground surface of a vehicle even if it is uneven. Therefore, the universal support is fastened securely without potential hazards of collapse and shake.

Figure 4:
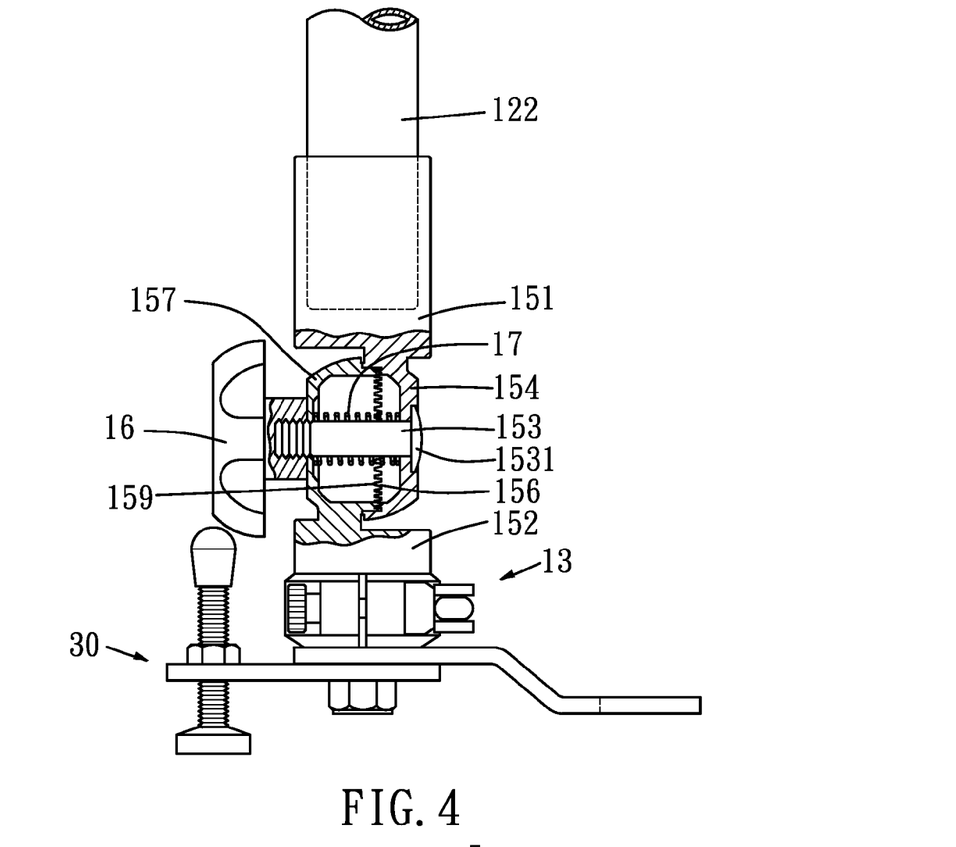
FIG. 4 is a partial profile of a second joint assembly of the present invention.

Please refer to FIG. 4. The second joint assembly 15 includes a third adjusting member 151, a fourth adjusting member 152 and a second positioning member 153. One end of the third adjusting member 151 connects to a end of the second outer tube 122 away from the second quick-release clamp unit 123, and another end thereof is disposed a third adjusting part 154 formed in a substantially semi-spherical shape. In a center axis of the third adjusting part 154 disposed a second engaging hole 155 with a non-circular profile. On an inner surface of the third adjusting part 154 is disposed a third tooth plate 156 (as shown in FIG. 1A). In addition, one end of the fourth adjusting member 152 connects to a end of the third tube assembly 13 away from the connecting unit 30, and another end thereof is disposed a fourth adjusting part 157, corresponding to the third adjusting part 154, formed in a substantially semi-spherical shape. In a center axis of the fourth adjusting part 157 is disposed a second positioning hole 158, while the second positioning hole 158 has the same axis as the second engaging hole 155. On an inner surface of the fourth adjusting part 157 is disposed a fourth tooth plate 159. Moreover, the second positioning member 153 pierces through the second engaging hole 155 and the second positioning hole 158 to adjust the relative distance of the third and the fourth adjusting members 151, 152, selectively engaging the third tooth plate 156 with the fourth tooth plate 159 or disengaging the third tooth plate 156 from the fourth tooth plate 159. When the third tooth plate 156 disengages from the fourth tooth plate 159, the third and the fourth adjusting members 151, 152 are rotatable with respect to each other. By the tooth plate structures design disclosed hereinabove, the angle between adjacent tube assemblies is adjustable and stronger structure strength of the joint units is achieved as well, which solves the problem that the conventional joint unit looses when the universal support are heavy-loaded.

In addition, the first joint assembly 15 also includes a first adjusting member 141, a second adjusting member 142 and a first positioning member 143. In which, one end of the first adjusting member 141 connects to a end of the first outer tube 112 away from the first quick-release clamp unit 113, and one end of the second adjusting member 142 connects to a end of the second inner tube 121 away from the second outer tube 122. The rest elements of the first joint assembly 14 is similar to those of the second joint assembly 15 disclosed hereinabove, therefore the first joint assembly 14 performs the same effect as the second joint assembly 15.

One end of the first positioning member 143 (second positioning member 153) is disposed a first screw nut (second screw nut 1531). On portions of the first and second positioning members 143, 153, close to the screw nuts, are disposed non-circular first and second engaging parts (unnumbered) corresponding to the engaging holes respectively. Another ends of the positioning members 143, 153 pierce out of the positioning holes to mount adjusting nuts 16, such that the fastening strength of two adjacent adjusting members is adjustable by screw the adjusting nut 16. Between the adjacent adjusting members is disposed a spring 17, thereby when the adjacent tooth plates are disengaged from each other, the spring 17 urges the adjusting members apart so as to facilitate the users to rotate the joint assembly.

Figure 5:
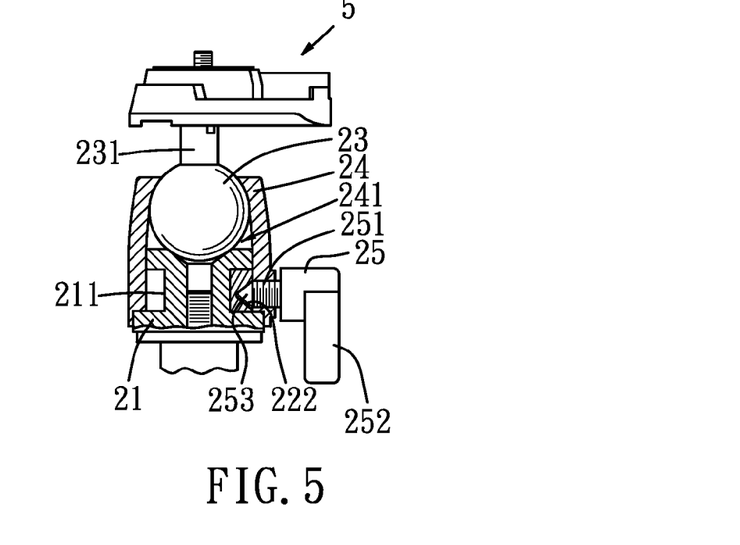
FIG. 5 is a partial profile of a mounting unit of the present invention.

Furthermore, the mounting unit 20 includes a socket 21, an arc-shaped urging body 22, a ball member 23, a sleeve 24, a jostle member 25 and a positioning bolt (not shown). The socket 21 axially extends from the top end of the first inner tube 111. Between two ends of the socket 21 is a positioning groove 211, and on a top surface thereof is a concave groove 212. In addition, the urging body 22 is disposed in the positioning groove 211 and has an outer arc surface 221. On the outer arc surface 221 is disposed a tapered groove 222 and a positioning notch 223 penetrating the urging body 22. The ball member 23 is disposed on the concave groove 212. A depth and a bore diameter of the concave groove 212 are smaller than a diameter of the ball member 23. On a top of the ball member 23 is extended a mounting pillar 231 to combine with a securing mount 5. Moreover, the sleeve 24 covers the ball member 23 and the socket 21. The sleeve 24 defines a receiving hole 241 axially penetrating the sleeve 24. A bore diameter of a top end of the receiving hole 241 is bigger than a diameter of the mounting pillar 231 and smaller than a diameter of the ball member 23. An inner surface of a top portion of the sleeve 24 is formed in an arc shape corresponding to a periphery of the ball member 23. On the bottom portion of the sleeve 24 is disposed a first threaded hole 242 corresponding to the tapered groove 222 and a second threaded hole corresponding to the positioning notch 223. The mounting pillar 231 pierces upward out of the receiving hole 241. A jostle member 25 includes a second screw 251 and a handle 252 disposed on one end of the second screw 251. On another end of the second screw 251 is a tapered jostle end 253 (as shown in FIG. 5). The positioning bolt is screwed through the second threaded hole and into the positioning notch 223.

Please refer to FIG. 5. The second screw 251 is screwed through the first threaded hole 242, and the tapered jostle end 253 is installed in the tapered groove 222. A center of the first threaded hole 242 is higher than that of the tapered groove 222, and an upper surface of the tapered groove 222 is located between the center and a top end of the first threaded hole 242. Therefore, the jostle member 25 moves downward along the tapered surface of the tapered groove 222 when it is screwed into the first threaded hole 242, thereby the sleeve 24 is guided downward as well, fastening the ball member 23 between the sleeve 24 and the concave groove 212 of the socket 21. In addition, the positioning notch 223 is extended upward from a bottom surface of the urging body 22, and the positioning bolt protrudes through the positioning notch 223 as well as the second threaded hole. Therefore, the urging body 22 will not rotate with respect to the sleeve 24, nor will the sleeve 24 escape upward from the engagement with the socket 21, yet the urging body 22 still has the ability to relatively move upward with respect to the positioning bolt to urge the socket 21 to position the ball member 23. Moreover, when the jostle member 25 is loosened, the ball member 23 can rotate within the space defined by the sleeve 24 and the top portion of the socket 21, and therefore the securing mount 5 can be adjusted universally. On the top portion of the sleeve 24 close to the receiving hole 241 is disposed a pair of vertical notches 243 in particular, while a breadth of each vertical notch 243 is slightly bigger than the diameter of the mounting pillar 231 so as to securely receive the mounting pillar 231 therein.

Figure 6:
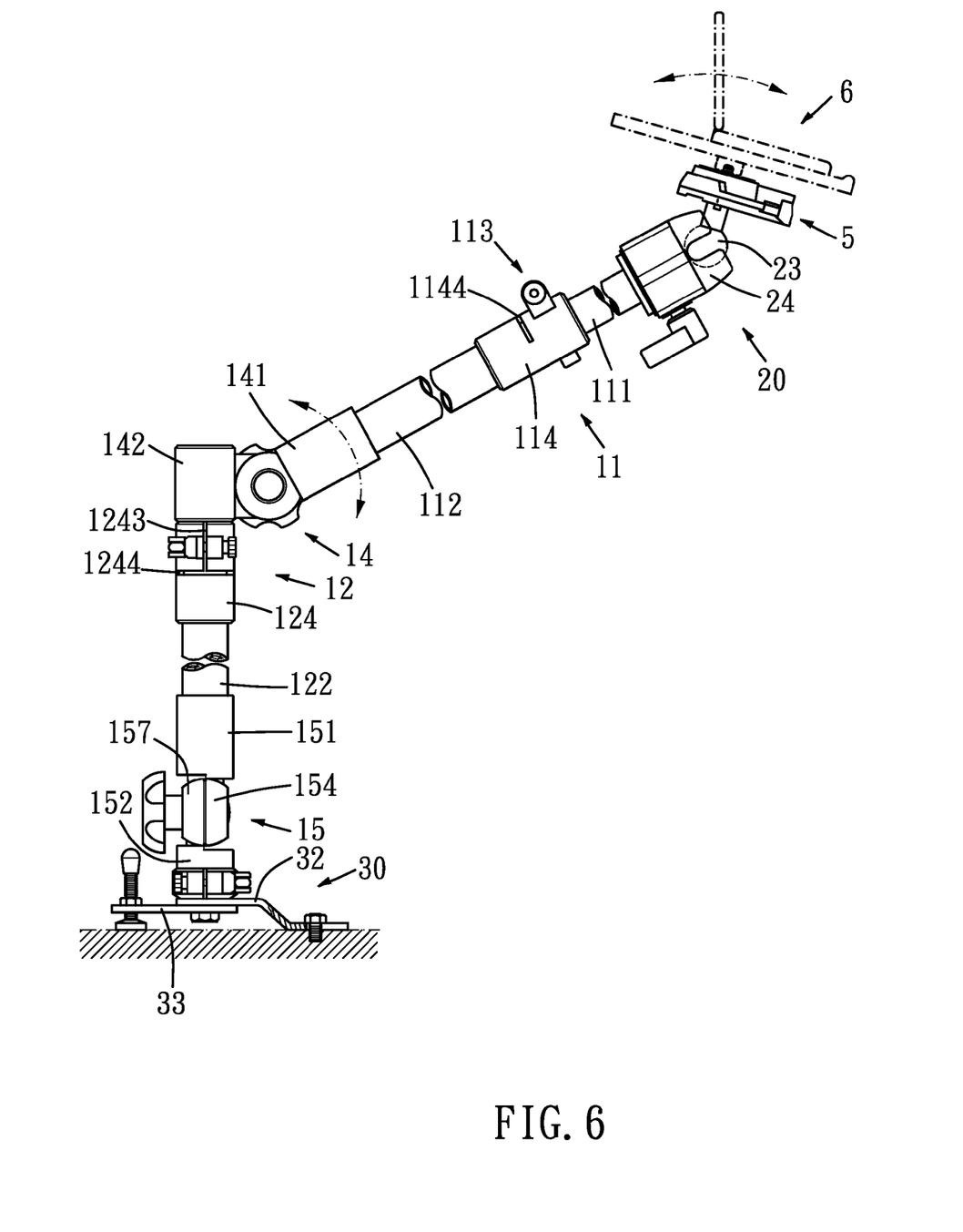
FIG. 6 is a diagram showing how to use a universal support of the present invention.
Figure 7A:
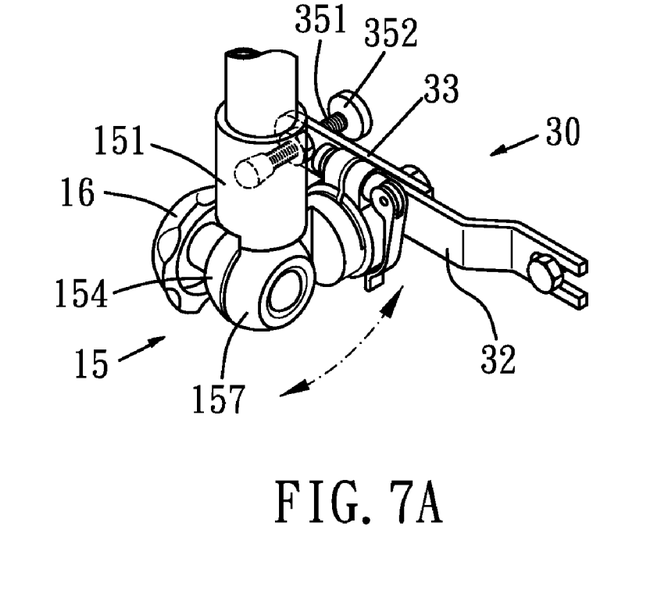
FIG. 7A is an embodiment of a connecting unit of the present invention.
Figure 7B:
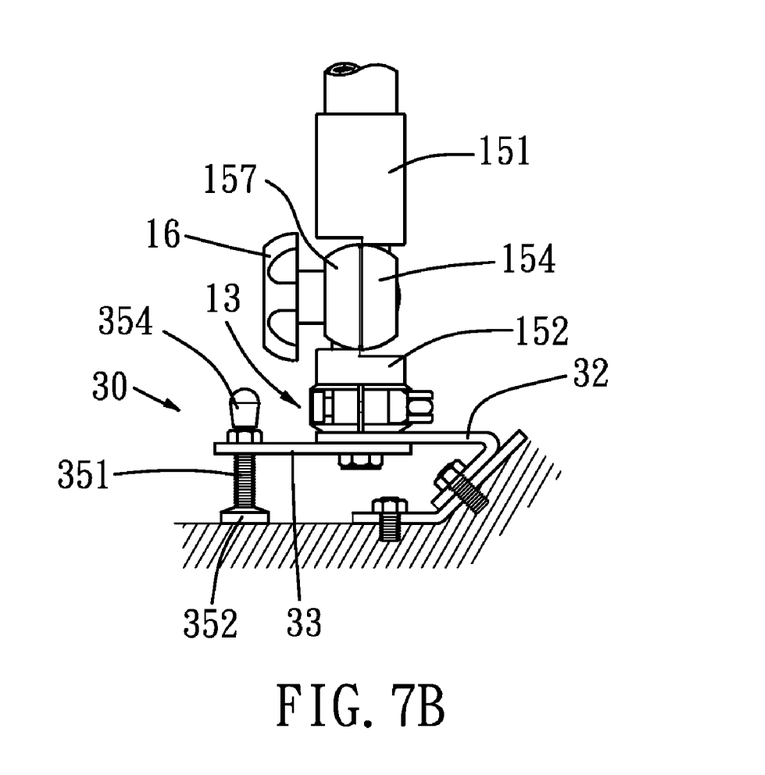
FIG. 7B is another embodiment of a connecting unit of the present invention.

Now please refer to FIG. 6. The universal support of the present invention is provided with two joint assemblies 14, 15, so that it can be adjusted to the most desired and comfortable angle for the users to utilize. In addition, the universal support of the present invention is further provided with a mounting unit 20, while the ball member 23 can rotate between the sleeve 24 and the socket 21 by simply loosening the jostle member 25, such that the securing mount 5 along with the laptop computer 6 attached thereon can be positioned at any desired angle. Whats more, the universal support is also provided with a connecting unit 30, thereby it is fastened securely to a stationary object such as a base of a vehicle seat. Or, the connecting unit 30 can also be fastened to a wall as shown in FIG. 7A. Still, the shape of the connecting plate 32 is very possible to be varied into any shape as long as it can be installed onto a stationary object with a different installation angle as shown in FIG. 7B.

What is claimed is:

1. A universal support, comprising:
   a brace unit;
   a mounting unit, disposed on a top end of the brace unit; and
   a connecting unit, disposed on a bottom end of the brace unit;
   wherein the brace unit comprises:
   a first tube assembly, comprising a first inner tube and a first outer tube, the first inner tube being telescopically received in the first outer tube, around an outer surface of the first outer tube disposed a first quick-release clamp unit, and a top end of the first inner tube connecting to the mounting unit;
   a second tube assembly, comprising a second inner tube and a second outer tube, the second inner tube being telescopically received in the second outer tube, around an outer surface of the second outer tube disposed a second quick-release clamp unit;
   a third tube assembly, a bottom end thereof connecting to the connecting unit;
   a first joint assembly, pivoted between the first and the second tube assemblies; and
   a second joint assembly, pivoted between the second and the third tube assemblies;
   wherein the first quick-release clamp unit comprises:
   a first clamping tube, comprising a first end and a second end, the first end being fastened to the first outer tube, and the second end receiving the first inner tube, on the second end axially disposed a vertical slot, on the first clamping tube radially disposed a horizontal slot at an extending angle of 180°±5°, and the horizontal slot communicating with the vertical slot;
   a pair of first ears, protruding on both sides of the vertical slot; and
   a first quick-release clamp assembly, piercing through the first ears;
   wherein the second quick-release clamp unit comprises:
   a second clamping tube, comprising a third end and a fourth end, the third end being fastened to the second outer tube, and the fourth end receiving the second inner tube, on the fourth end axially disposed a vertical slot, on the second clamping tube radially disposed a horizontal slot at an extending angle of 180°±5°, and the horizontal slot communicating with the vertical slot;
   a pair of second ears, protruding on both sides of the vertical slot; and
   a second quick-release clamp assembly, piercing through the second ears;
   wherein the connecting unit comprises:
   a fastening base, fastening to a bottom end of the third tube assembly, and a bottom of the fastening base having a first through hole;
   a connecting plate, one end thereof disposed a connecting member, and another end thereof disposed a second through hole;
   a supporting plate, on both ends thereof disposed a pivoting hole and a third through hole respectively;
   a bolt, piercing through the first through hole, the second through hole and the pivoting hole, a bottom end of the bolt mounting a nut; and
   a supporting member, comprising a first screw and a socket head, the first screw being elevatably fastened to the third through hole, on a bottom end of the first screw disposed a ball head covered by the socket head, and the socket head being universally rotatable with respect to the ball head;
   wherein the first joint assembly comprises:
   a first adjusting member, one end thereof connecting to a end of the first outer tube away from the first quick-release clamp unit, another end thereof being disposed a first adjusting part formed in a substantially semi-spherical shape, in a center axis of the first adjusting part disposed a first engaging hole with a non-circular profile, on an inner surface of the first adjusting part disposed a first tooth plate;
   a second adjusting member, one end thereof connecting to a end of the second inner tube away from the second outer tube, another end thereof being disposed a second adjusting part, corresponding to the first adjusting part, formed in a substantially semi-spherical shape, in a center axis of the second adjusting part disposed a first positioning hole, and the first positioning hole having a same axis as the first engaging hole, on an inner surface of the second adjusting part disposed a second tooth plate; and a first positioning member, piercing through the first engaging hole and the first positioning hole to adjust a relative distance of the first and the second adjusting members, selectively engaging the first tooth plate with the second tooth plate or disengaging the first tooth plate from the second tooth plate, and when the first tooth plate disengaging from the second tooth plate, the first and the second adjusting members being rotatable with respect to each other;

wherein the second joint assembly comprises:

a third adjusting member, one end thereof connecting to a end of the second outer tube away from the second quick-release clamp unit, another end thereof being disposed a third adjusting part formed in a substantially semi-spherical shape, in a center axis of the third adjusting part disposed a second engaging hole with a non-circular profile, on an inner surface of the third adjusting part disposed a third tooth plate;

a fourth adjusting member, one end thereof connecting to a end of the third tube assembly away from the connecting unit, another end thereof being disposed a fourth adjusting part, corresponding to the third adjusting part, formed in a substantially semi-spherical shape, in a center axis of the fourth adjusting part disposed a second positioning hole, and the second positioning hole having a same axis as the second engaging hole, on an inner surface of the fourth adjusting part disposed a fourth tooth plate; and a second positioning member, piercing through the second engaging hole and the second positioning hole to adjust a relative distance of the third and the fourth adjusting members, selectively engaging the third tooth plate with the fourth tooth plate or disengaging the third tooth plate from the fourth tooth plate, and when the third tooth plate disengaging from the fourth tooth plate, the third and the fourth adjusting members being rotatable with respect to each other.

2. The universal support of claim 1, wherein the first quick-release clamp unit further comprises a first C-shaped tube sandwiched between the second end of the first clamping tube and the first inner tube; wherein the second quick-release clamp further comprises a second C-shaped tube sandwiched between the second end of the second clamping tube and the second inner tube.

3. The universal support of claim 1, wherein the pivoting hole of the supporting plate is an elongated hole.

4. The universal support of claim 1, wherein a top end of the first screw is disposed a cap.

5. The universal support of claim 1, wherein one end of the first positioning member is disposed a first screw nut, on a portion of the first positioning member close to the first screw nut is disposed a non-circular first engaging part corresponding to the first engaging hole, another end of the first positioning member pierces out of the first positioning hole to mount an adjusting nut;

wherein one end of the second positioning member is disposed a second screw nut, on a portion of the second positioning member close to the second screw nut is disposed a non-circular second engaging part corresponding to the second engaging hole, another end of the second positioning member pierces out of the second positioning hole to mount an adjusting nut.

6. The universal support of claim 5, wherein between the first and the second adjusting parts is disposed a spring, and between the third and the fourth adjusting parts is disposed a spring as well.

7. The universal support of claim 1, wherein between the first and the second adjusting parts is disposed a spring, and between the third and the fourth adjusting parts is disposed a spring as well.

8. A universal support, comprising:

a brace unit;

a mounting unit, disposed on a top end of the brace unit; and a connecting unit, disposed on a bottom end of the brace unit;

wherein the brace unit comprises:

a first tube assembly, comprising a first inner tube and a first outer tube, the first inner tube being telescopically received in the first outer tube, around an outer surface of the first outer tube disposed a first quick-release clamp unit, and a top end of the first inner tube connecting to the mounting unit;

a second tube assembly, comprising a second inner tube and a second outer tube, the second inner tube being telescopically received in the second outer tube, around an outer surface of the second outer tube disposed a second quick-release clamp unit;

a third tube assembly, a bottom end thereof connecting to the connecting unit;

a first joint assembly, pivoted between the first and the second tube assemblies; and a second joint assembly, pivoted between the second and the third tube assemblies;

wherein the first quick-release clamp unit comprises:

a first clamping tube, comprising a first end and a second end, the first end being fastened to the first outer tube, and the second end receiving the first inner tube, on the second end axially disposed a vertical slot, on the first clamping tube radially disposed a horizontal slot at an extending angle of 180°±5°, and the horizontal slot communicating with the vertical slot;

a pair of first ears, protruding on both sides of the vertical slot; and a first quick-release clamp assembly, piercing through the first ears;

wherein the second quick-release clamp unit comprises:

a second clamping tube, comprising a third end and a fourth end, the third end being fastened to the second outer tube, and the fourth end receiving the second inner tube, on the fourth end axially disposed a vertical slot, on the second clamping tube radially disposed a horizontal slot at an extending angle of 180°±5°, and the horizontal slot communicating with the vertical slot;

a pair of second ears, protruding on both sides of the vertical slot; and a second quick-release clamp assembly, piercing through the second ears;

wherein the connecting unit comprises:

a fastening base, fastening to a bottom end of the third tube assembly, and a bottom of the fastening base having a first through hole;

a connecting plate, one end thereof disposed a connecting member, and another end thereof disposed a second through hole;

a supporting plate, on both ends thereof disposed a pivoting hole and a third through hole respectively;

a bolt, piercing through the first through hole, the second through hole and the pivoting hole, a bottom end of the bolt mounting a nut; and a supporting member, comprising a first screw and a socket head, the first screw being elevatably fastened to the third through hole, on a bottom end of the first screw disposed a ball head covered by the socket head, and the socket head being universally rotatable with respect to the ball head;

wherein the mounting unit comprises:

a socket, axially extending from the top end of the first inner tube, between two ends of the socket being a positioning groove, on a top surface of the socket being a concave groove;

an arc-shaped urging body, disposed in the positioning groove, the urging body having an outer arc surface, on the outer arc surface disposed a tapered groove and a positioning notch penetrating the urging body;

a ball member, disposed on the concave groove, a depth and a bore diameter of the concave groove being smaller than a diameter of the ball member, on a top of the ball member extended a mounting pillar;

a sleeve, covering the ball member and the socket, the sleeve defining a receiving hole axially penetrating the sleeve, a bore diameter of a top end of the receiving hole being bigger than a diameter of the mounting pillar and smaller than the diameter of the ball member, an inner surface of a top portion of the sleeve being formed in an arc shape corresponding to a periphery of the ball member, on a bottom portion of the sleeve disposed a first threaded hole corresponding to the tapered groove and a second threaded hole corresponding to the positioning notch, a center of the first threaded hole being higher than that of the tapered groove, an upper surface of the tapered groove located between the center and a top end of the first threaded hole, and the mounting pillar piercing upward out of the receiving hole to combine with a securing mount;

a jostle member, comprising a second screw and a handle disposed on one end of the second screw, on another end of the second screw being a tapered jostle end, the second screw screwed through the first threaded hole, and the tapered jostle end installed in the tapered groove; and a positioning bolt, screwed through the second threaded hole and into the positioning notch.

9. The universal support of claim 8, wherein the positioning notch is extended upward from a bottom surface of the urging body.

10. The universal support of claim 8, wherein on the top portion of the sleeve close to the receiving hole is disposed at least a vertical notch, a breadth of the vertical notch is slightly bigger than the diameter of the mounting pillar so as to receive the mounting pillar in the vertical notch.

* * * * *